United States Patent
Linz et al.

(10) Patent No.: US 11,939,998 B2
(45) Date of Patent: Mar. 26, 2024

(54) ARRANGEMENT FOR SECURING AT LEAST ONE CIRCLIP AGAINST CENTRIFUGAL FORCE, WHICH CIRCLIP IS AXIALLY FASTENED ON A ROTOR SHAFT OF AN ELECTRICAL MACHINE FOR POSITIONAL SECURING, AND USE OF AN ARRANGEMENT OF THIS TYPE

(71) Applicant: Schaeffler Technologies AG & Co. KG, Herzogenaurach (DE)

(72) Inventors: Bernhard Linz, Wilhelmsdorf (DE); Marcel Laake, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 675 days.

(21) Appl. No.: 17/049,995

(22) PCT Filed: Feb. 20, 2019

(86) PCT No.: PCT/DE2019/100159
§ 371 (c)(1),
(2) Date: Oct. 23, 2020

(87) PCT Pub. No.: WO2019/214763
PCT Pub. Date: Nov. 14, 2019

(65) Prior Publication Data
US 2021/0231155 A1 Jul. 29, 2021

(30) Foreign Application Priority Data
May 7, 2018 (DE) ..................... 10 2018 110 881.8

(51) Int. Cl.
*F16B 21/18* (2006.01)
*F16B 4/00* (2006.01)
*H02K 5/173* (2006.01)
*H02K 7/08* (2006.01)

(52) U.S. Cl.
CPC ............ *F16B 21/186* (2013.01); *F16B 4/004* (2013.01); *H02K 5/1732* (2013.01); *H02K 7/083* (2013.01); *F16B 21/18* (2013.01)

(58) Field of Classification Search
CPC ........ F16B 4/004; F16B 21/18; F16B 21/183; F16B 21/186; H02K 5/1732; H02K 7/08; H02K 7/083; F16C 35/063
(Continued)

(56) References Cited

U.S. PATENT DOCUMENTS 2,297,960 A * 10/1942 Elliott .................. B60B 27/023
301/110.5
3,813,102 A 5/1974 Derman
(Continued)

FOREIGN PATENT DOCUMENTS

DE 4007942 C1 9/1990
DE 102008056059 A1 2/2010
(Continued)

*Primary Examiner* — Roberta S Delisle

(57) ABSTRACT

An arrangement secures at least one circlip against centrifugal force. The circlip is axially fastened on a rotor shaft of an electrical machine for positional securing. At least one securing element is provided for securing against the centrifugal forces acting on the circlip when the rotor shaft rotates. The at least one securing element is placed onto the rotor shaft by means of a first portion for fastening and, by means of a second portion, is slid at least partially over the circlip and radially secures the circlip.

5 Claims, 1 Drawing Sheet

(58) Field of Classification Search
USPC .......................................... 411/511, 517–518
See application file for complete search history.

(56) References Cited

U.S. PATENT DOCUMENTS

| | | | | |
|---|---|---|---|---|
| 8,251,627 | B2 * | 8/2012 | Inoue | F02M 59/44 |
| | | | | 411/517 |
| 8,506,224 | B2 * | 8/2013 | Cosenza | F16B 41/002 |
| | | | | 411/521 |
| 11,287,028 | B2 * | 3/2022 | Linz | F16H 57/08 |
| 2008/0175690 | A1 * | 7/2008 | Kitano | A44B 17/0076 |
| | | | | 411/517 |
| 2009/0211864 | A1 * | 8/2009 | Inomori | F16D 13/585 |
| | | | | 192/70.11 |
| 2009/0220353 | A1 * | 9/2009 | Schwarzkopf | F04B 27/1072 |
| | | | | 417/222.1 |
| 2010/0303584 | A1 * | 12/2010 | Van Der Veen | B24B 37/32 |
| | | | | 411/517 |
| 2014/0271040 | A1 * | 9/2014 | Burgman | F16B 21/186 |
| | | | | 411/517 |
| 2014/0356102 | A1 * | 12/2014 | Sayre | F16H 41/24 |
| | | | | 411/531 |
| 2015/0362106 | A1 * | 12/2015 | Laughlin | F16B 7/182 |
| | | | | 411/517 |

FOREIGN PATENT DOCUMENTS

| | | |
|---|---|---|
| DE | 102011079754 A1 | 1/2013 |
| DE | 102011082017 A1 | 3/2013 |
| DE | 202013008469 U1 | 2/2015 |
| EP | 2565418 A1 | 3/2013 |

\* cited by examiner

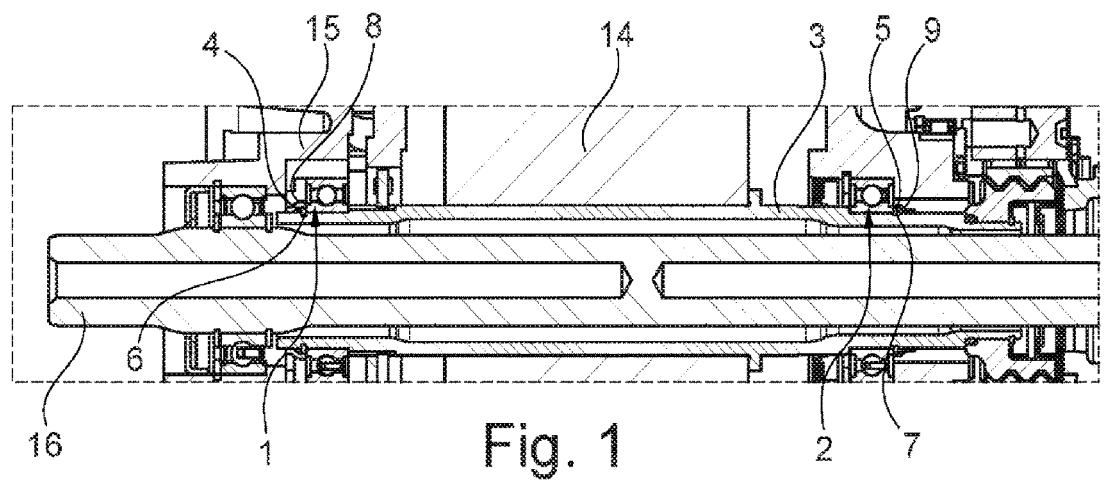
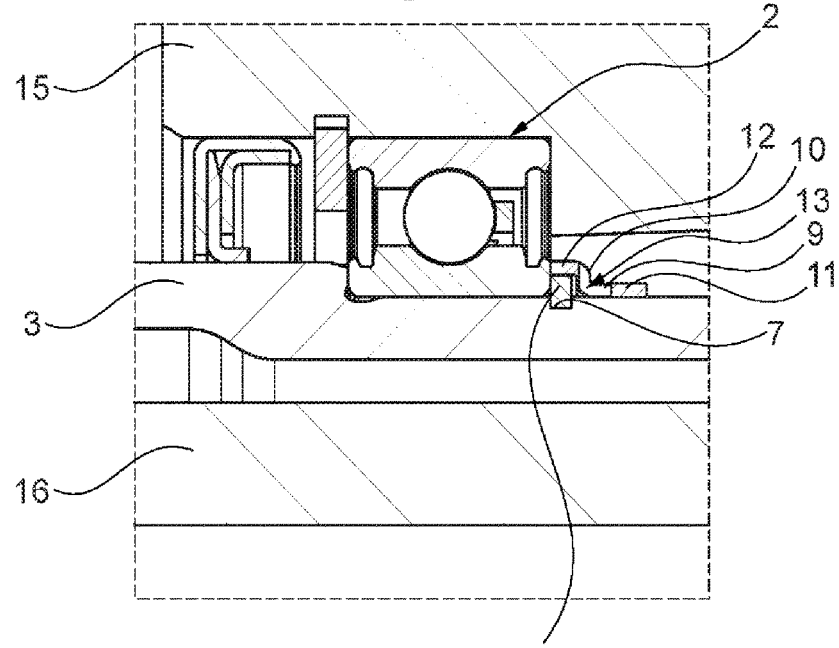
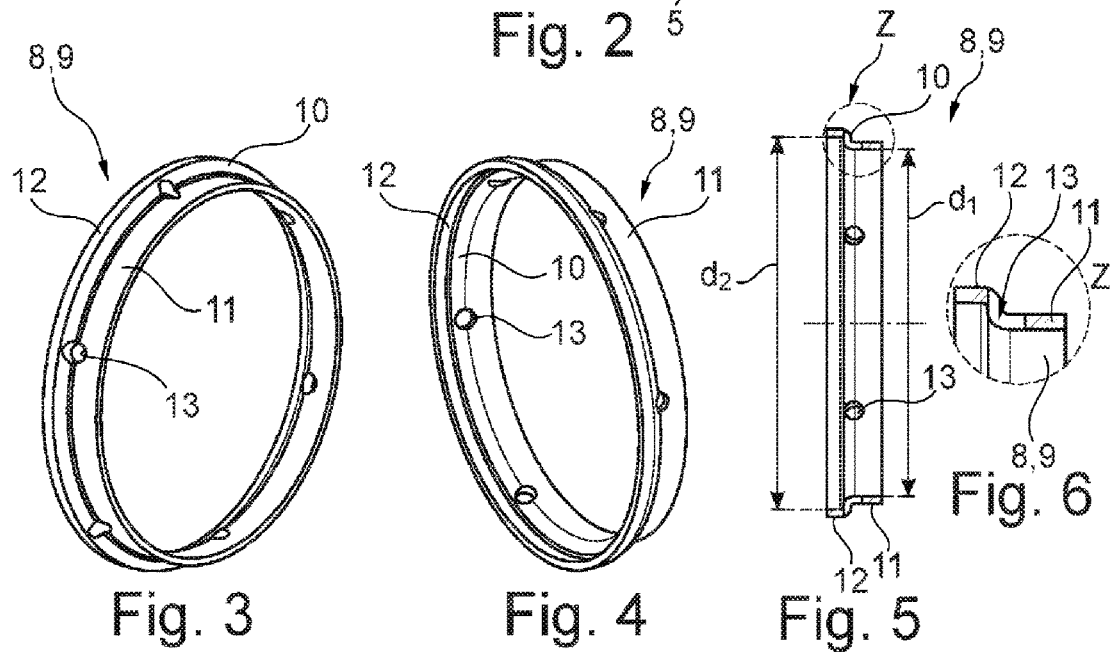

ARRANGEMENT FOR SECURING AT LEAST ONE CIRCLIP AGAINST CENTRIFUGAL FORCE, WHICH CIRCLIP IS AXIALLY FASTENED ON A ROTOR SHAFT OF AN ELECTRICAL MACHINE FOR POSITIONAL SECURING, AND USE OF AN ARRANGEMENT OF THIS TYPE

CROSS-REFERENCE TO RELATED APPLICATIONS

This application is the U.S. National Phase of PCT Appln. No. PCT/DE2019/100159 filed Feb. 20, 2019, which claims priority to DE 10 2018 110 881.8 filed May 7, 2018, the entire disclosures of which are incorporated by reference herein.

TECHNICAL FIELD

The disclosure relates to an arrangement for securing at least one circlip against centrifugal force, which circlip is axially fastened on a rotor shaft of an electrical machine for positional securing.

BACKGROUND

From DE 10 2011 082 017 A1, a bearing arrangement for a drive device having at least one electrical machine is known. A first and a second roller bearing are provided there for mounting a rotor shaft of an electrical machine. The roller bearings are each fixed on the rotor shaft by a circlip embedded in a shaft groove. A disadvantage of this embodiment is the fact that the centrifugal forces acting during operation can lead to an expansion and loosening of the respective circlip on rotor shafts in electrical machines from a speed of approx. 6000 rpm and higher with simple standard circlips, whereby the axial securing on the rotor shaft is no longer guaranteed. Therefore, in such cases, the use of special circlips, in particular with a so-called self-locking function, is necessary. These are self-contained and therefore cannot open under centrifugal force. The use of special circlips is expensive and can be implemented only with great effort during series assembly or by hand. In addition, dismantling is usually only possible by destroying the circlip.

SUMMARY

It is desirable to simplify an arrangement of the aforementioned type with regard to its structure and assembly and to make it operationally reliable.

An arrangement is proposed for securing at least one circlip against centrifugal force, which circlip is axially fastened on a rotor shaft of an electrical machine for positional securing. At least one securing element is provided for securing against the centrifugal forces acting on the circlip when the rotor shaft rotates, which at least one securing element is placed onto the rotor shaft by means of a first portion for fastening and, by means of a second portion, is slid at least partially over the circlip and radially secures the circlip. In this way, a centrifugal force securing device of the circlip that is simply constructed and can be easily mounted on the rotor shaft is achieved. As a result, centrifugal force-related expansion and loosening of the circlip during operation can be reliably avoided and the use of standard circlips that are easy to manufacture and assemble on rotor shafts of electrical machines is possible regardless of their rotational speed. This means that there is no need for expensive special circlips or other intricately constructed solutions that are complex to assemble.

The securing element for fastening is preferably pressed onto the rotor shaft with a force fit. The arrangement is particularly easy to assemble and dismantle without being destroyed. Other releasable form-fitting or form- and force-fitting connections, in particular a snap connection, between the securing element and the rotor shaft are also conceivable.

In a further particularly preferred embodiment, the securing element is designed as a securing sleeve. This is preferably pressed with a first portion onto the outer diameter of the rotor shaft and encompasses the circlip at the outer diameter with a second portion.

The arrangement can be used in a particularly advantageous manner for securing the axial position of at least one bearing arranged on the rotor shaft, which bearing is axially fastened with at least one circlip on the rotor shaft, wherein at least one securing element is provided for securing against centrifugal force acting on the circlip, which at least one securing element is placed onto the rotor shaft by means of a first portion for fastening and, by means of a second portion, is slid at least partially over the circlip and radially secures the circlip.

In a particularly preferred embodiment, two circlips are provided to secure the axial position of two bearings arranged on the rotor shaft, wherein, to secure against centrifugal force of the circlips, two securing elements which are designed as securing sleeves and are each placed onto the rotor shaft by means of a first portion for fastening and, by means of a second portion, are slid over the respective circlip and radially secure said circlip. In this way, the arrangement can be used particularly advantageously for securing the axial position of a rotor shaft bearing of an electrical machine.

The arrangement can also be used to secure against centrifugal force of the circlips which, instead of bearings, axially secure other components, such as in particular a sun gear of a planetary gear stage, which are non-rotatably connected on a rotor shaft or on another rapidly rotating shaft. It is also conceivable to use the arrangement for securing against centrifugal force of at least one circlip axially fastened on the rotor shaft, which circlip axially securing the rotor shaft on an adjacent component fixed to the housing, in particular a housing.

It is advantageous to place the securing element with one axial end at least partially on a bearing ring of the bearing arranged on the rotor shaft. In this way, the bearing ring also serves as an assembly stop for the securing element.

In another particularly preferred simple embodiment, the securing element has a Z-shaped longitudinal profile. This allows in particular a simple transition between the first and second portions of the securing sleeve.

The arrangement is particularly easy to dismantle if the securing element has a plurality of openings for engaging an extraction tool for dismantling.

The securing element is produced particularly simply by forming in a non-cutting manner, in particular from sheet metal or plastic.

In the arrangement, it is possible in a particularly advantageous manner to use at least one standard circlip, for example a Seeger type SW circlip, to secure the axial position on a rotor shaft regardless of the speed. This can be mass-produced inexpensively and can simply be attached to the rotor shaft for assembly and fastened in a securing groove on the outer diameter of the rotor shaft. It can also be easily dismantled without being destroyed.

The arrangement may be used in an electric axle drive of a vehicle. The arrangement with the rotor shaft and the electric machine forms an electric drive as part of the axle drive of the vehicle. The arrangement preferably has two securing elements for securing against centrifugal forces of two circlips arranged on the rotor shaft, said circlips axially securing two bearings arranged on the rotor shaft to the axial outer sides thereof facing away from the rotor. Here the bearings form the rotor shaft bearings. Preferably, an output shaft of the electric axle drive is passed through the rotor shaft in a space-saving manner.

In a further particularly advantageous manner, the arrangement allows simple assembly, wherein at least one component arranged in a rotationally fixed manner on the rotor shaft, in particular a bearing, is axially fastened with at least one circlip on the rotor shaft and at least one securing element is axially pressed onto the rotor shaft and is pushed over the circlip at least in portions for securing against centrifugal force.

BRIEF DESCRIPTION OF THE DRAWINGS

Further features result from the following description and the figures, in which an exemplary embodiment is shown in a simplified manner. It can be seen that:

FIG. 1 shows an intersected view of an arrangement for securing at least one circlip against centrifugal force, which circlip is axially fastened on a rotor shaft of an electrical machine for positional securing, FIG. 2 shows an enlarged portion from FIG. 1, FIGS. 3 and 4 show individual views of a securing element of the arrangement from FIGS. 1 and 2, FIG. 5 shows an intersected view of a securing element from FIGS. 3 and 4, FIG. 6 shows an enlarged portion from FIG. 5.

DETAILED DESCRIPTION

FIGS. 1 and 2 show an example of an arrangement for securing two circlips 4, 5 axially fastened on a rotor shaft 3 of an electrical machine against centrifugal force. These serve to secure the axial position of two bearings 1, 2 which are arranged on the rotor shaft 3 of the electrical machine and are designed as radial ball bearings and form the rotor shaft bearings. The rotor shaft 3 carries a coaxially arranged rotor 14 of the electrical machine, wherein the inner bearing rings of the bearings 1, 2 are axially secured on the axial outer sides facing away from the rotor by a respective circlip 4, 5. The circlips 4, 5 rest on the axial outer sides of the bearing inner rings of the bearings 1, 2 and each secure them axially. They are each recessed into a securing groove 6, 7 on the outer diameter of the rotor shaft 3 for attachment.

On the outer sides of the circlips 4, 5, a securing element 8, 9 is placed coaxially on the rotor shaft 3 and pressed over the respective circlip 4, 5 so that the securing elements 8, 9 fully encompass the circlips 4, 5 on the outer diameter. In this way, the latter are secured radially by the respective securing element 8, 9 against unwanted opening and loosening due to the effect of centrifugal force when the rotor shaft 3 rotates. As a result, the circlips 4, 5 can be designed for securing the axial position on the rotor shaft 3 as standard external circlips, for example of the Seeger SW type, which can be easily assembled and disassembled without being destroyed in a particularly advantageous manner.

The securing elements 8, 9 are each designed as a securing sleeve which is divided by an annular radial shoulder 10 into two cylindrical portions 11, 12 and in this way forms a Z-shaped longitudinal profile. On a first portion 11, the securing sleeves 8, 9 are pressed coaxially with the inner diameter onto the outer diameter of the rotor shaft 3. With a second portion 12 that is radially widened at the shoulder 10 compared to the first portion 11, the securing sleeves 8, 9 encompass the outer diameter of the circlips 4, 5 with the inner diameter of their axially inner ends. For assembly, the securing sleeves 8, 9 can simply be pressed with their inner axial ends over the outer diameter of the previously assembled circlips 4, 5 when they are pressed onto the rotor shaft 3 until they abut with the end faces of their axially inner ends on the bearing inner rings of the bearings 1, 2 as an assembly stop in an axially annular manner. In this way, it is possible to axially secure the bearings 1, 2 on the rotor shaft 3 using standard circlips 4, which are radially encompassed by the securing sleeves 8, 9 as centrifugal force safeguards.

The securing sleeves 8, 9 each form with the radial shoulder 10 a Z-shaped longitudinal profile as a so-called Z-disc (FIGS. 3 to 6). The shoulder 10 provides the transition between the first portion 11 with the first inner diameter $d_1$ and the second portion 12 with the expanded second inner diameter $d_2$. The first inner diameter $d_1$ is selected so that the first portion 11 forms a press fit with the outer diameter of the shaft 3, while the second inner diameter $d_2$ is of a size that allows the securing sleeves 8, 9 to slide with the end of the second portion 12 with a slight radial assembly clearance over the outer diameter of the circlips 5, 6 during assembly. In the area of the shoulder 10, a plurality of openings 13 distributed evenly over the circumference are provided, which are designed as radial through bores into which an extraction tool for extracting the securing sleeve 8, 9 from the rotor shaft 3 can engage on the outer diameter. In this way, a non-destructive dismantling of the securing sleeves 8, 9 and the circlips 4, 5 is possible.

The arrangement can be used particularly advantageously in an electric axle drive of a vehicle (FIGS. 1 and 2). Here, the arrangement with the rotor shaft 3 and the electrical machine forms a part of the axle drive. The rotor shaft 3 is radially supported on a housing 15 via the bearings 1, 2 (FIGS. 1 and 2). An output shaft 16 of the axle drive is passed coaxially through the rotor shaft 3, which is designed as a hollow shaft.

List of reference symbols
1 Bearing
2 Bearing
3 Rotor shaft
4 Circlip
5 Circlip
6 Securing groove
7 Securing groove
8 Securing element, securing sleeve
9 Securing element, securing sleeve
10 Shoulder
11 Portion
12 Portion
13 Opening
14 Rotor
15 Housing
16 Output shaft
$d_1$ Inner diameter
$d_2$ Inner diameter

The invention claimed is:

1. An electric axle drive comprising:
a rotor shaft having a first groove;
a first circlip engaged in the first groove;
a first securing sleeve having a first portion axially fastened on the rotor shaft and a second portion extending radially over the first circlip to prevent release of the first circlip due to centrifugal forces when the rotor shaft rotates; and a first bearing having a first inner ring axially positioned with respect to the rotor shaft by the first circlip.

2. The electric axle according to claim 1, wherein the first portion of the securing sleeve is pressed onto the rotor shaft with a force fit.

3. The electric axle according to claim 1, further comprising:

a second bearing having a second inner ring;

a second circlip engaged in a second groove of the rotor shaft to axially position the second inner ring with respect to the rotor shaft; and a second securing sleeve having a third portion axially fastened on the rotor shaft and a. fourth portion extending radially over the second circlip to prevent release of the second circlip due to centrifugal forces when the rotor shaft rotates.

4. The electric axle according to claim 3, further comprising a rotor fixed to the rotor shaft between the first and second bearings.

5. The electric axle according to claim 1, wherein the first securing sleeve has a plurality of openings for engagement of an extraction tool for dismantling.

\* \* \* \* \*